United States Patent [19]

Sturman et al.

[11] Patent Number: 4,501,290
[45] Date of Patent: Feb. 26, 1985

[54] PRESSURE REGULATING MECHANICALLY AND ELECTRICALLY OPERABLE SHUT OFF VALVES

[76] Inventors: Oded E. Sturman, 18241 Andrea Cir. N.; Benjamin Grill, 9819 Etiwanda Ave., both of Northridge, Calif. 91329; Lynn Harrison, 23554 Cherry St., Newhall, Calif. 91321

[21] Appl. No.: 429,459

[22] Filed: Sep. 30, 1982

[51] Int. Cl.³ .................. G05D 16/08; G05D 16/20
[52] U.S. Cl. ............................. 137/495; 137/505.18
[58] Field of Search .................. 137/495, 505.18; 251/69, 130

[56] References Cited

U.S. PATENT DOCUMENTS

| | | | |
|---|---|---|---|
| 714,143 | 11/1902 | Carlson | 137/495 |
| 2,764,996 | 10/1956 | Brown | 137/505.42 X |
| 2,842,146 | 7/1958 | Schuster | 137/495 X |
| 2,887,122 | 5/1959 | Chapman | 137/495 |
| 2,933,099 | 4/1960 | Lisiak | 137/505.18 X |
| 3,087,705 | 4/1963 | Hamilton | 137/505.18 X |
| 3,857,407 | 12/1974 | Olson | 137/495 |
| 4,265,270 | 5/1981 | Satoh | 137/495 X |

Primary Examiner—Robert G. Nilson
Attorney, Agent, or Firm—Blakely, Sokoloff, Taylor & Zafman

[57] ABSTRACT

Pressure regulating mechanically operable valves intended primarily for use as pressure regulating shut off valves are disclosed. The valves utilize a simple piston assembly operative between a valve open position and a valve closed position responsive to a spring biasing the assembly toward the open position against an opposite force proportional to the outlet pressure. The piston assembly may have only a single seal to seal the assembly against leakage with a mechanical shut off mechanism operative on only a 180 degree rotation thereof being cooperatively disposed with respect to the piston assembly so as to not require any additional seals. An electrically operable unlatching means is provided to close the valve upon receipt of a pulse from a battery or other electrical system, exemplary circuits, including a unique moisture sensing system are enclosed.

26 Claims, 10 Drawing Figures

PRESSURE REGULATING MECHANICALLY AND ELECTRICALLY OPERABLE SHUT OFF VALVES

BACKGROUND OF THE INVENTION

1. Field of the Invention

The present invention relates to the field of pressure regulators and valves and more particularly, to valves generally used in in-line applications.

2. Prior Art

In many applications around the home and elsewhere, valves are used in various in-line applications to provide an on/off control for the supply of water, natural gas and other fluids to appliances and other devices which, in turn, normally have their own valve control system. In such instances the purpose of the in-line on/off valve is to provide an overriding turnoff capability in the event of leakage or other malfunction of the valve control system in the appliance or other item connected to the on/off valve. In many such instances the pressure of the main supply, at least as seen by the on/off valve, may vary substantially with time of day or operation of other devices fed by the same supply, or may normally be higher than ideal for the particular appliance or other device. In such instances it would be desirable if the pressure of the supply could be regulated and of course, since it is the pressure at the on/off valve which is of interest to the device connected to the on/off valve, it would be particularly desirable if the pressure could be regulated at the valve itself. Finally, there are instances where it would be desirable to be able to electrically turn off the valve to provide an overriding electrically controlled safety feature for either local or remote operation. By way of example, one might include a moisture sensor under an appliance which would sense the moisture resulting from leakage in the appliance to electrically trigger the turnoff valve before sufficient leakage occurred to ruin carpets and the like. Obviously, while conventional 60 Hz, 110 volt operated turnoff valves could be used, such valves would be wasteful of power, require installation by an electrician and would be relatively large and expensive. Accordingly, a battery powered electrically operable shut off valve is preferred. It is the combination of a pressure regulating electrically and manually operable shut off valve to which the present invention is directed.

Various types of shut off valves are well known in the prior art, as substantially any type of mechanical valve may be used for this purpose. Usually such valves are based upon some form of lead screw arrangement whereby rotation of the valve actuating handle through a number of turns may force a valve closure member against a valve seat for valve closure purposes, or withdraw the valve closure member from the valve seat to open the valve. While such valves could also be used to somewhat regulate the flow rate, assuming pressures, etc. are relatively constant, such valves are not commonly used for this purpose because of the lack of meaningful basis for adjustment of the valve, and the variation of supply pressure with time or other conditions. Accordingly, valves normally used for in-line applications to provide an on/off capability are normally used in the fully on and fully off positions.

Various types of pressure regulators are also well-known in the prior art, including both fixed pressure and manually controllable pressure regulators. Normally such regulators are provided as separate units with either no on/off capability, or an on/off capability only achieved by adjusting the pressure regulator beyond a zero outlet pressure.

An example of a pressure balanced regulator is U.S. Pat. No. 3,756,558 by Okui. Okui discloses in the first figure thereof a fluid control valve having an inlet and an outlet with a moving member between the inlet and outlet chambers. In the Okui valve, both the input and output portions of the device are pressure balanced, thereby requiring additional structure to sense the outlet pressure and control the moving member for regulation of flow. This additional structure adds cost to the device and increases the likelihood of breakdown. Further, the only shut off capability this device has is by way of a multi-turn adjustment of the regulated pressure control to effectively reduce the regulated pressure to zero.

An additional example of previous pressure regulating valves in U.S. Pat. No. 702,266 by Webb. As with Okui, Webb discloses a valve which is pressure balanced on the input side. The valve is relatively complicated, and not suitable for use as a compact pressure regulating shut off valve as is the present invention. Further, the shut off capability is provided by a lead screw mounted member projecting into the low pressure area of the regulator, thereby requiring multiple turns for the on/off control and providing an additional source of leakage in the valve.

Electrically operable valves are also known, the most common of which are solenoid operated valves requiring continuous power when in one of the two possible states. As such, such valves are not well suited for use as electrically operable shut off valves, particularly for battery operation. Examples of valves which are operable or could be made operable on shorter energy pulses may be seen in U.S. Pat. Nos. 3,355,139; 3,995,651 and 4,098,284. All of these valves however, are of a mechanical detent type wherein a solenoid actuator releases a mechanical linkage retaining the valve in the open position, thereby allowing the valve to close.

BRIEF SUMMARY OF THE INVENTION

Pressure regulating mechanically operable valves intended primarily for use as pressure regulating shut off valves are disclosed. The valves utilize a simple piston assembly operative between a valve open position and a valve closed position responsive to a spring biasing the assembly toward the open position against an opposite force proportional to the outlet pressure. The piston assembly may have only a single seal to seal the assembly against leakage with a mechanical shut off mechanism operative on only a 180 degree rotation thereof being cooperatively disposed with respect to the piston assembly so as to not require any additional seals. An electrically operable unlatching means is provided to close the valve upon receipt of a pulse from a battery or other electrical system, exemplary circuits, including a unique moisture sensing system are enclosed.

DETAILED DESCRIPTION OF THE INVENTION

Figures 1, 2:
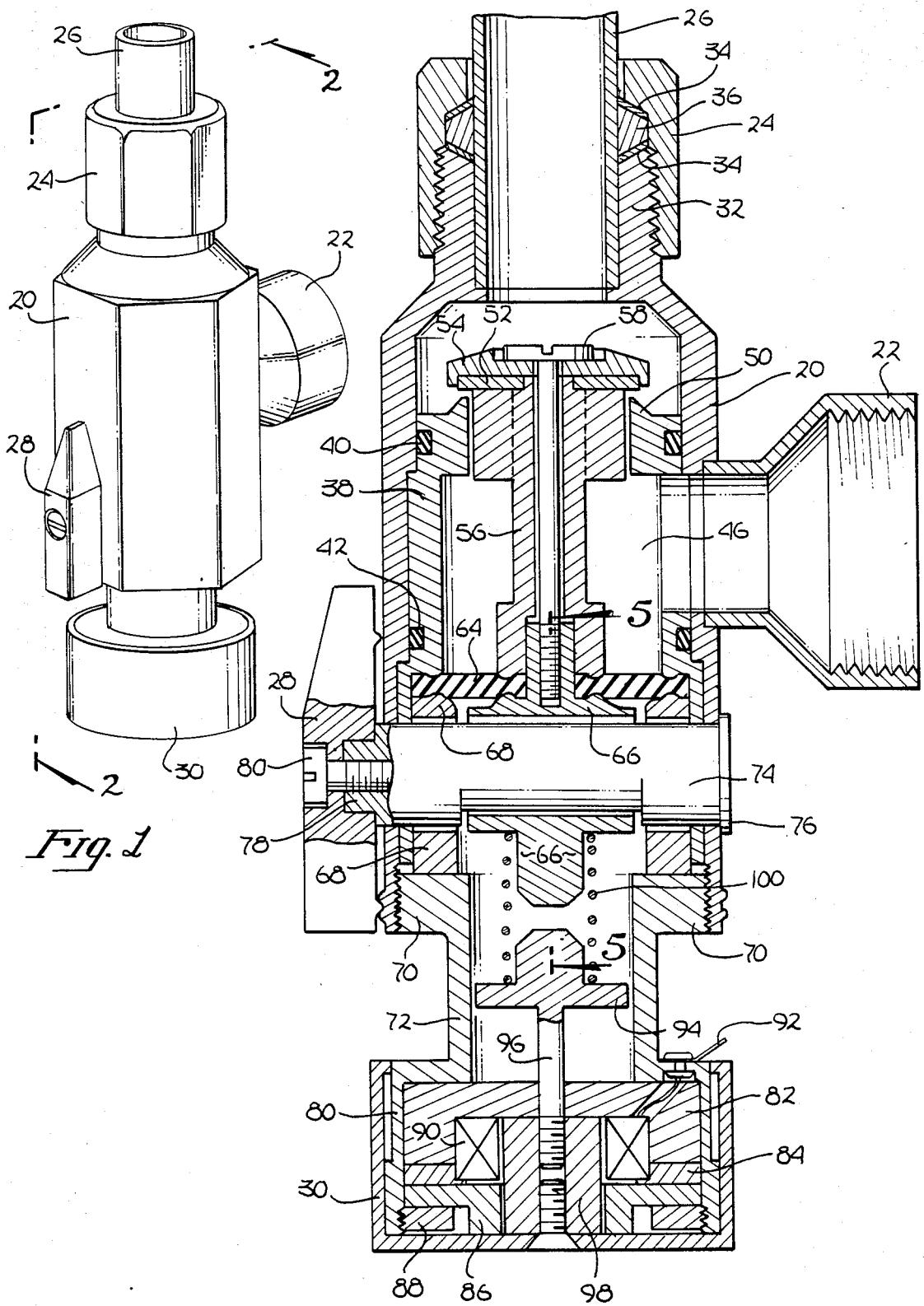
FIG. 1 is a perspective view of one embodiment of the present invention.
FIG. 2 is a cross-section of the embodiment of FIG. 1 taken on an expanded scale and showing the valve in the valve open position.

First referring to FIG. 1, a perspective view of one embodiment of the present invention as it would be coupled to a water line, such as a faucet water supply line or dishwasher water line may be seen. This embodiment is characterized by an outer valve body 20, a standard female pipe connection 22 for connection to a standard threaded pipe supply line, and an upward projecting nipple, which together with nut 24, provides a standard coupling to tubing 26. The valve is also characterized by a lever 28 which provides a simple on/off control for the valve. As shall subsequently be seen, with the lever in the position shown in FIG. 1, the valve is normally open and pressure regulating unless the overriding electrically operating shut off feature has been activated. Finally, at the lower portion of the valve is a short cylindrical member or cap 30 housing the electrically operable shut off mechanism and movable to manually re-arm this feature.

Now referring to FIG. 2, a cross section of the valve of FIG. 1 taken along line 2—2 of that figure may be seen. Valve body member 20 in the preferred embodiment is a brass member having a generally cylindrical inner wall terminating at the upper end at the threaded nipple 32. The nipple 32 in combination with nut 24, conical washers 34 and rubber member 36 provide the conventional compression coupling to tubing 26, characteristically used with shut off valves for faucets and the like. The female pipe connection 22 for the valve inlet is also a brass member, in the preferred embodiments being brazed to body 20 to provide a permanent integral assembly of the two brass parts.

Fitting within the inner diameter of body 20 is a generally tubular member 38, being sealed with respect to the body 20 both above and below the inlet connection 22 by O-Rings 40 and 42 respectively. The tubular member has an opening or hole 44 cooperatively disposed with respect to the inlet connection 22 to provide fluid communication between the inlet port and region 46.

The upper end of tubular member 38 terminates in a valve seat 50 at the upper end thereof. Cooperating with the valve seat is a valve closure member 52 retained by cap 54 supported on piston 56 by screw 58. Region 62 adjacent the cylindrical section of member 38 terminating at the valve seat 50 in the preferred embodiment is a four legged guide to maintain the top of piston 56 concentric with the valve seat, having plenty of flow area between the legs to handle the required flow when the valve is open. Piston 56, aside from supporting the elastic valve closure member 52, extends downward to abut the inner periphery of a diaphragm 64 located below the opening for connection 22. A second member 66 abuts the opposing face of the inner periphery of diaphragm 64, with screw 58 clamping piston 56 and member 66 together with the diaphragm therebetween.

The outer periphery of diaphragm 64 is similarly clamped between a lower portion of cylindrical member 38 and member 68 so that the fluid pressurized region 46 is sealed therebelow by diaphragm 64. The whole assembly is held in body 20 by the threaded region 70 of lower member 72 engaging mating threads at the lower end of body 20.

Passing through body 20, the lower portion of member 38 and a clearance hole in member 68 for this purpose, is a shaft 74 having a slight head 76 on one end thereof and a drive section 78 at the other end thereof for coupling to handle 28. This assembly is retained in position by screw 80 so that rotation of handle 28 will rotate shaft 74 therewith.

Located below region 72 and integral therewith is a housing 80 containing a magnetic structure therein. In particular, a magnetic member 82, together with a permanent magnet 84 and second magnetic member 86, are retained in housing 80 by threaded member 88. In the preferred embodiment members 82 and 86 are relatively soft magnetic members having low retentivity, with permanent magnet 84 giving the overall combination a substantial retentivity or permanent magnet effect. Disposed within member 82 is a coil 90, electrically connected to terminals 92 available at the outside of housing 80. Slidably positioned within the center of member 72 is a piston-like member 94 having a downward projecting extension 96 engaging a third magnetic member 98 therebelow. Above member 94 is a spring 100 acting in compression to urge the lower portion of member 66 upward, and conversely member 94 downward.

Lever 28 as shown in FIGS. 1 and 2 is shown in the valve manually opened position. Thus it may be seen that valve closure member 52 is shown significantly off of valve seat 50 so as to define a flow path therebetween. Also as shown, member 56 has substantial clearance above and below shaft 74 and accordingly, the piston assembly is free to move up and down as required to regulate the flow, or more properly the pressure in the outlet of the valve.

The effective area of diaphragm 64 in this embodiment is chosen to be slightly larger than the effective area of the valve seat so that the inlet pressure will provide some net valve closing force on the piston assembly. In addition however, it may be seen that coil spring 100 is urging the piston assembly upward, and that the outlet pressure in outlet tube 26 is at the same time urging the piston assembly downward toward the valve closed position by the action of the outlet pressure on an area equal to the area encircled by valve seat 50. Thus, neglecting for the moment the slight pressure unbalance with respect to the inlet pressure, the valve will self-regulate the outlet pressure at the point where the outlet pressure acting on the effective area of the piston assembly is balanced by the spring 100. Any disturbance in the outlet flow, such as a decrease in the outlet flow requirement, will momentarily cause an increase in the outlet pressure, urging the piston assembly downward to more restrictive flow to maintain the outlet pressure at the regulated value. Similarly, a drop in the outlet pressure will result in spring 100 pushing the valve to a further valve open position to increase the flow to again drive the outlet pressure to the regulated value. Thus it may be seen that with the assembly of FIG. 2, the valve will self-regulate the flow as required to maintain the regulated output pressure as determined primarily by the balance between spring 100 and the effective cross-sectional area of valve seat 50.

Figure 3:
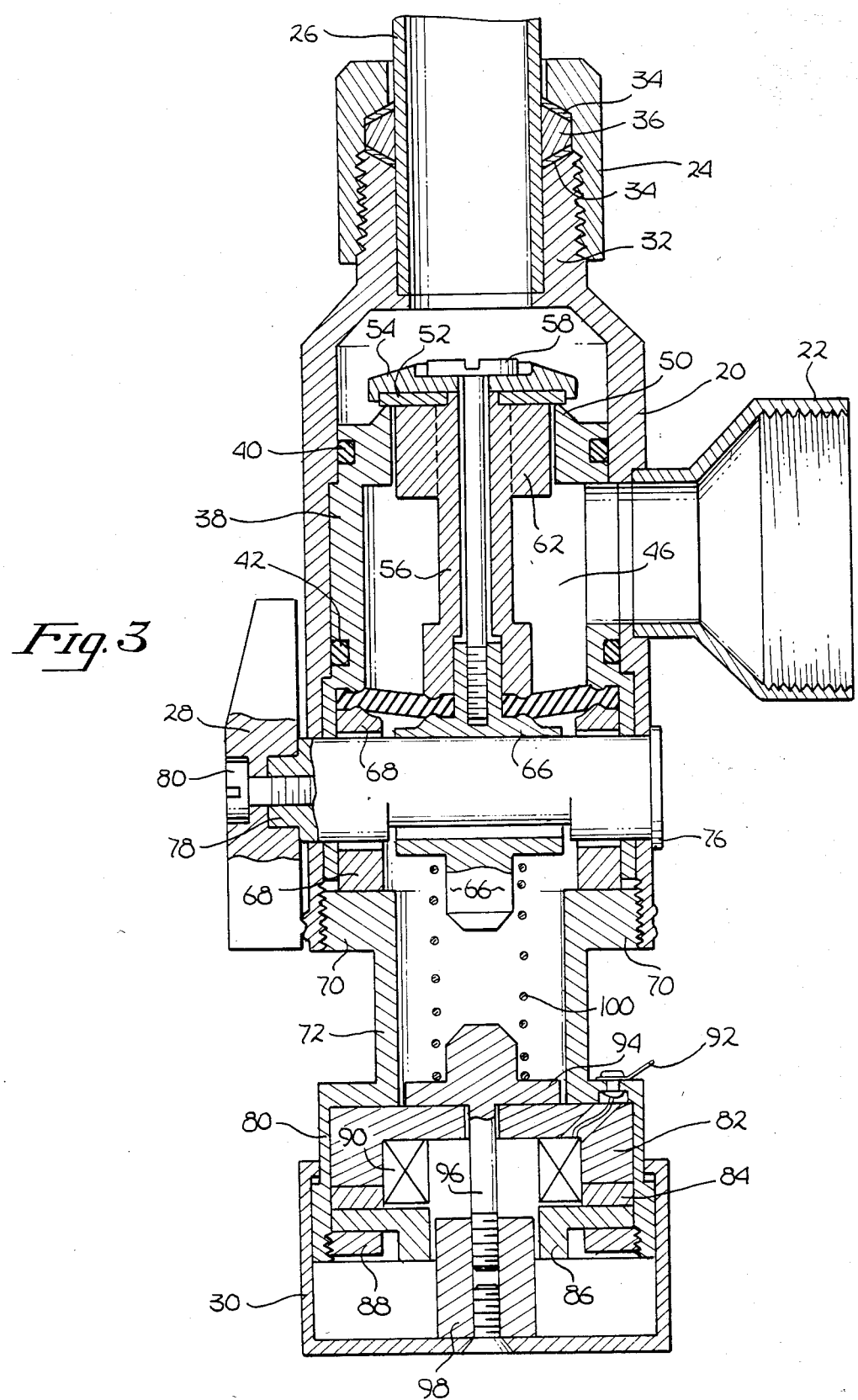
FIG. 3 is a cross-section similar to the cross-section of FIG. 2, illustrating the valve in a valve closed position as actuated by an electric signal.

In FIG. 2, member 98 is maintained in abutment with the underside of member 82 and thus member 94 is maintained in the position shown by the magnetic attraction between members 98 and 82. In particular, the permanent magnet 84 has a substantial MMF so that in the zero air gap condition a relatively high magnetic field will be maintained in members 98, 82, 86 and the permanent magnet itself. If a substantially equal but opposite magnetizing force is momentarily generated by coil 90, the flux in the magnetic circuit will momentarily grossly drop, thereby allowing spring 100 to urge member 94 together with members 96 and 98 as well as cap 30 downward, to open a significant air gap between members 98 and 82. Once this occurs, the flux in the magnetic circuit falls drastically so that even on removal of the current in coil 90, the various parts will move to the position shown in FIG. 3. In particular, cap 30 and magnetic member 98 have moved to a lower position, as have members 94 and 96, thereby relieving the compression spring 100. In this condition the slight pressure unbalance in the inlet pressure resulting from the effective diameter of diaphragm 64 being slightly larger than the diameter of the valve seat 50 results in a net downward force on the piston assembly, irrespective of the outlet pressure, thereby closing the valve as shown in FIG. 3. In this state the inlet pressure will maintain the valve in the closed position until the magnetic release is again latched by manually forcing cap 30 upward until member 98 contacts member 82, at which time the permanent magnet will cause sufficient flux in the magnetic circuit to latch member 98 at that position until again unlatched by an appropriate current pulse. Because the total energy in the current pulse required to trigger the magnetic latch is relatively small, the system may readily be triggered by appropriate battery powered circuitry using relatively small transistor batteries.

Figure 5:
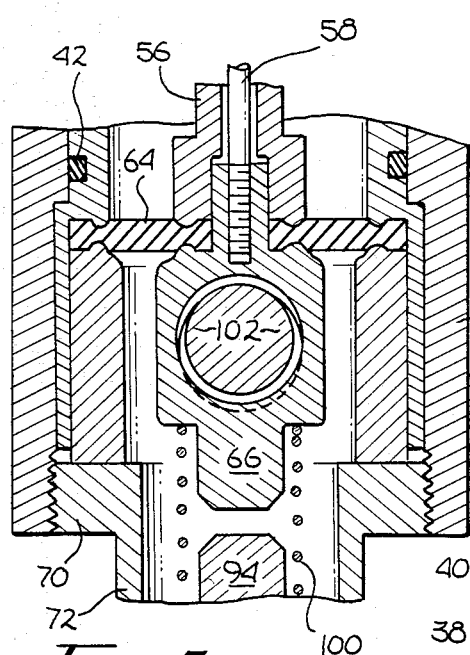
FIGS. 5 and 6 are cross-sections illustrating the operation of the mechanical valve and closure mechanism.
Figure 4:
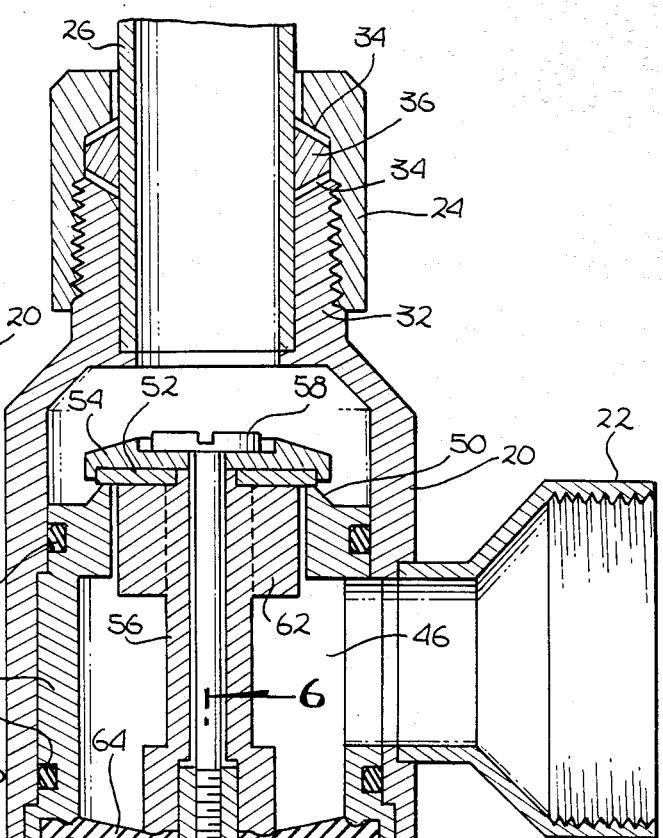
FIG. 4 is a cross-section of the valve similar to the cross-section of FIG. 2 showing the valve in the valve closed position as mechanically actuated.
Figure 6:
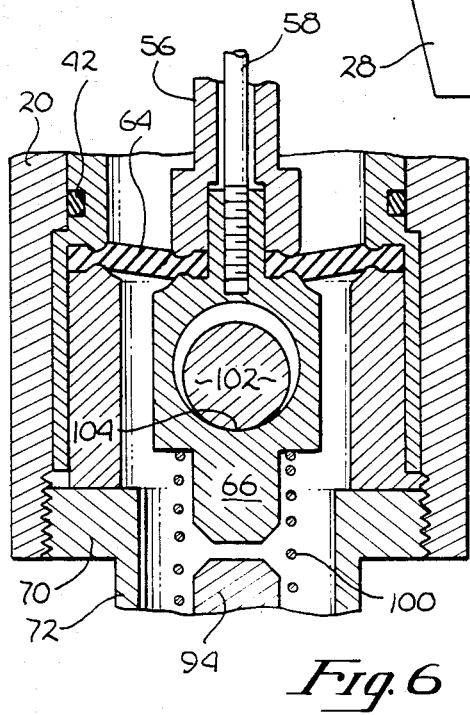

Now referring to FIGS. 4 through 6, the mechanical shut off system may be seen. In particular, region 102 of shaft 74 acts as a cam, engaging surface 104 of member 66 to force the piston assembly downward to the valve closed position shown in FIG. 4. Thus, independent of the condition of the magnetic latch, the rotation of handle 28 to the position shown positively and firmly locks the valve in the valve closed position. Thus it may be seen that with the present invention valve of relatively simple design, a simple on/off valve is achieved, which valve pressure regulates the output of the valve when on, at a level determined by the selection of coil spring 100, and which valve may be readily electrically triggered for an over-riding electrically actuated shut off capability for either local or remote electrical actuation.

Figure 7:
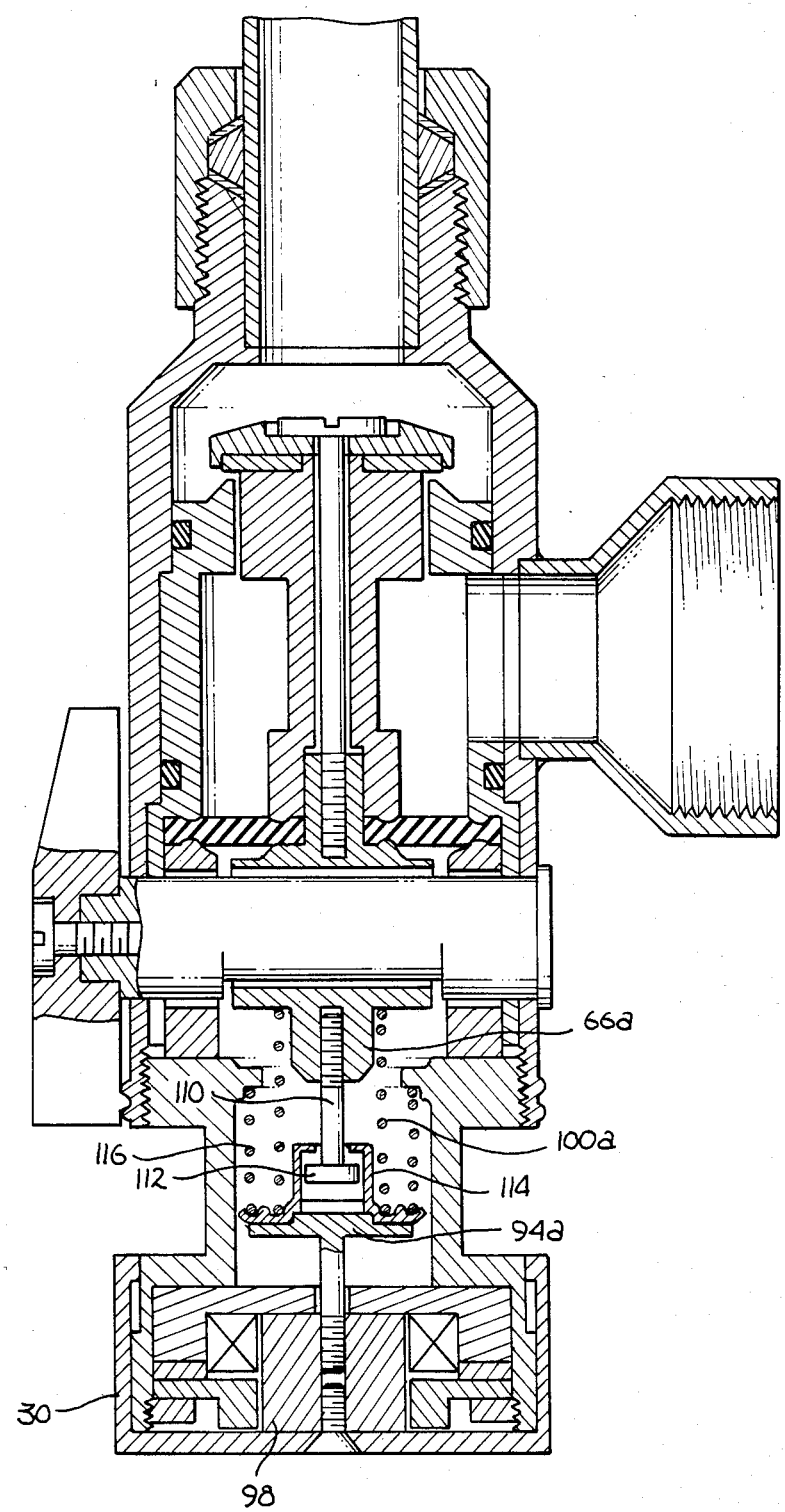
FIG. 7 is a cross-section of an alternate embodiment valve shown in the valve partially opened position.
Figure 8:
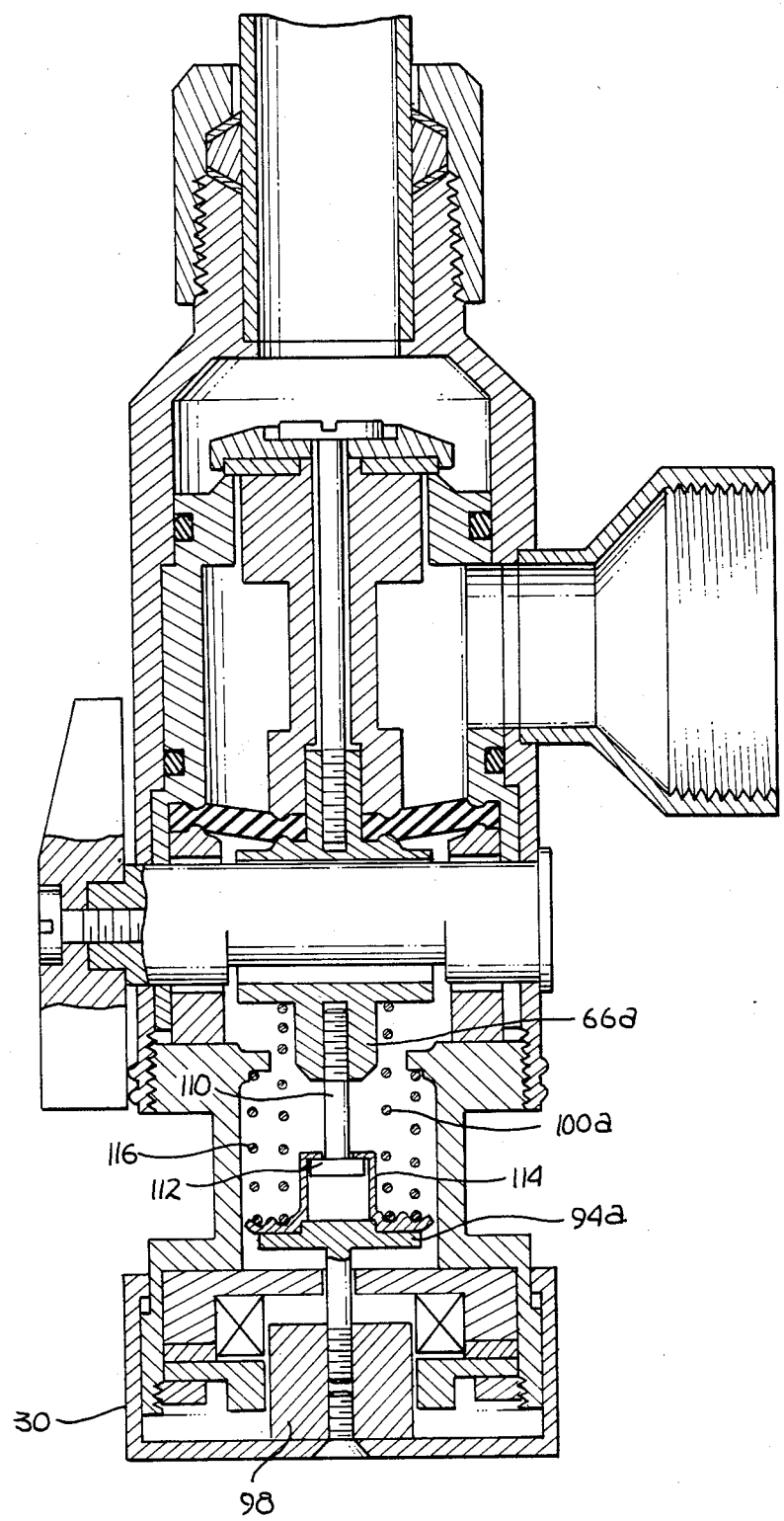
FIG. 8 is a cross-section corresponding to the cross-section of the embodiment of FIG. 7 shown in the valve closed position as electrically actuated to that position.

Now referring to FIGS. 7 and 8, an alternate embodiment may be seen. This embodiment may be identical to the previous embodiment in many respects, being different primarily in the manner of spring biasing of the piston assembly. In particular, the lower portion of member 66a of this embodiment has a screw 110 therein, the head 112 of which is captured within a cap-like member 114. As before, a coil spring 100a encourages the piston assembly upward, with clearance between pin 110 and cap 114 allowing the piston assembly to move upward and downward as required for appropriate regulation. A second coil spring 116, also active in compression, extends between the lower portion of cap 114 and a projection 118 on member 70. In the condition shown in FIG. 7, spring 116 is not operative in that the latching of members 98 and 82 together determines the position of cap 114, independent of spring 116. When the system is triggered however, so that the magnetic release is actuated as shown in FIG. 8, both springs 116 and 100a encourage cap 114 together with members 94a, 98 and 30 downward. After a relatively short movement, further relative motion between cap 114 and head 112 of screw 110 is prevented by the bottoming of the head 112 in the cap as shown in FIG. 8. In this condition, spring 100a is rendered inactive in that cap 114 will essentially move in unison with the piston assembly. Spring 116, on the other hand, will become active encouraging cap 114 downward and by so doing, urging the entire piston assembly downward to the valve closed position. Consequently, this embodiment may have the inlet side of the pressure regulating valve totally pressure balanced, i.e., the effective diameter of the diaphragm may be made equal to the diameter of the valve seat, as closure of the valve upon electrical actuation is assured by spring 116 independent of the inlet pressure. This embodiment has the further advantage that a substantial amount of preload may be placed on coil spring 100a so that the variation in spring force with piston assembly position can be made relatively small. This is to be compared with the earlier embodiment wherein the amount of preload that can be used is limited by the fact that substantially all the preload must be removed for the electrically actuated shut off to function properly.

Figure 9:
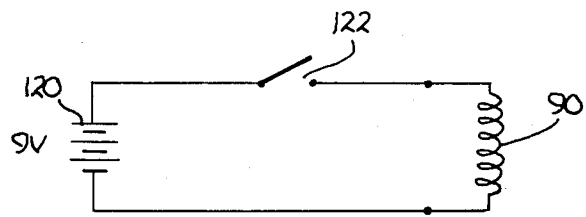
FIG. 9 is a circuit diagram of a simple valve actuating circuit.

Now referring to FIG. 9, a very simple circuit for acutating the shut off valve may be seen. In this figure, coil 90 of the shut off valve is couplable to a battery supply such as a 9 volt battery 120 through a switch or switch means 122 which, of course, may be any appropriate form of switch, such as, by way of example, a mechanical switch, a mercury switch or electronic switch. Obviously depending upon the application, the battery, switch or both may be remotely located as desired.

Figure 10:
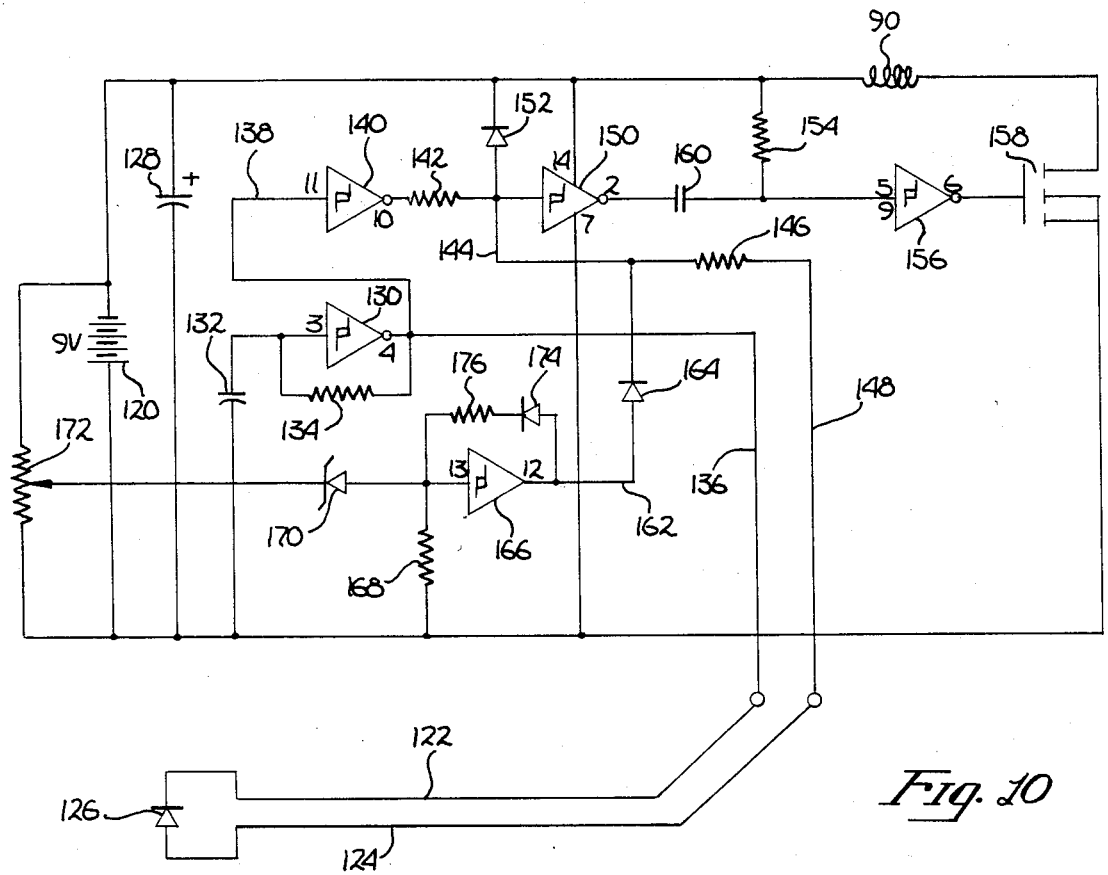
FIG. 10 is a diagram for a system having a moisture sensor probe complete with probe open, probe short and low battery detection features.

A more sophisticated control for the shut off valve is shown in FIG. 10 wherein battery 120 is coupled to coil 90 through a circuit which provides a multiplicity of functions. In particular, the purpose of the circuit is to monitor a moisture probe comprised of conductor lines 122 and 124 to sense conductivity therebetween to indicate the presence of moisture. Such a system might be used, by way of example, as a safety shut off valve on a water utilizing appliance, such as a dishwasher, clothes washer or other appliance, with the probe located generally on the floor adjacent or under the appliance to detect leakage therefrom. A relatively simple probe may be used for such a purpose provided the probe is characterized by two conductors placed in sufficient proximity so that water contacting both probes will provide a sufficient conductivity therebetween for circuit sensing. In the particular probe used in conjunction with the circuit of FIG. 10, a diode 126 is provided at the end of the probe, the function of which shall be subsequently described.

In the circuit of FIG. 10, battery 120 maintains a voltage on capacitor 128 which provides a sufficient charge storage to trigger the shut off valve when called upon to do so without requiring a high current pulse from the battery itself at the time. The circuit shown uses a CMOS hex Schmitt trigger, specifically part number 4584, available from a number of manufacturers, five of the hex Schmitt triggers being used in the circuit as shown. Schmitt trigger 130 has a capacitor 132 coupled to the input thereof, as well as having its output fed back through resistor 134 (the use of CMOS components allows the use generally of very high resistance resistors so that battery current drain because of the resistors is very low, resulting in a battery life of a year or more). Because these are inverting Schmitt triggers, the resistor 134 effectively provides negative feed back so that in combination with capacitor 132, Schmitt trigger 130 operates as a relatively low frequency oscillator. The output of this oscillator is coupled through line 136 to probe line 122, and is also coupled through line 138 to another Schmitt trigger 140. Accordingly, the output of Schmitt trigger 140 is a signal which is the inverse of the signal on line 136, that is, when the output of Schmitt trigger 130 is high, the output of Schmitt trigger 140 is low, and vice versa. Taking for the moment the condition when the output of Schmitt trigger 130 is high and the output of Schmitt trigger 140 is low, the low output of Schmitt trigger 140 is coupled through resistor 142, line 144, resistor 146 and line 148 to probe line 124. The high signal on probe line 122 in comparison to the low signal on probe line 124 back biases diode 126, effectively taking the diode out of the circuit. The foregoing assumes, of course, that the probe is dry. With the output of Schmitt trigger 140 low, diode 152 is back biased and the output of Schmitt trigger 150 is high. When the output of the oscillator comprising Schmitt trigger 130 goes low, line 136 and thus probe line 122 also go low. This forward biases diode 126 so that the input to Schmitt trigger 150 is again held low (resistor 142 having a much higher resistance than resistor 146). Consequently, in normal operation, the input to Schmitt trigger 150 is held low and the output thereof remains high. consequently, resistor 154 holds the input to Schmitt trigger 156 high, the output thereof being low to maintain field effect device 158 off.

When the probe is in water, the resistance between the probe line 122 and 124 falls well below the value of resistor 142. Consequently, in the portion of the cycle when the output of Schmitt trigger 130 goes high, conduction between probes 122 and 124 causes the input to Schmitt trigger 150 to go high (resistor 142 being much larger than resistor 146 and larger than the resistance between the probe lines when in water). This pulses the output of Schmitt trigger 150 low, temporarily pulling the input through Schmitt trigger 156 low, pulsing field effect device 158 on for a sufficient length of time to provide a sufficient current pulse through the shut off valve coil 90 to turn off the valve. Similarly, if one of the probe lines is broken or open, a similar operating pulse to turn off the valve will occur when the output of Schmitt trigger 130 is low and the output of Schmitt trigger 140 is high. In particular, because of the break or open, line 144 is not pulled low by the forward biasing of diode 126 because of the open, thereby allowing resistor 142 to pull the input to Schmitt trigger 150 high, thereby pulsing the input to Schmitt trigger 156 low, etc. (capacitor 160 and resistor 154 providing the time constant to provide the desired current pulse duration for operating the valve). In the case of a short between probe lines, obviously this appears like the probe is in water, thereby also shutting off the valve. Consequently the unit has various fail-safe features which cause the valve to close when moisture is being sensed as desired, or in the event the probe is somehow damaged or inoperative because of an open or short in the circuitry therefor.

The foregoing analysis neglected the effect of any voltage on line 162 by effectively presuming that diode 164 was back biased to isolate line 162 from line 144 regardless of the high or low state of line 144. This of course, is the case of normal operation, as the output of Schmitt trigger 166 is normally low, being held low by holding the input thereof high through the combination of potentiometer 172 across the battery and zener diode 170. However, as the battery approaches the end of its useful life, the battery voltage will decrease, whereby the input voltage to Schmitt trigger 166 will decrease, ultimately reaching the trigger voltage for the Schmitt trigger, driving the output thereof high to drive line 144 high through diode 146 to again effectively pulse the valve for the closing thereof. Thus the system has the further fail-safe feature of a low battery voltage detector whereby all of the more common failure modes will result in actuation of the shut off valve as a safety override (diode 174 and resistor 176 provide a reduced hysteresis in the Schmitt trigger 166 to enhance operation of the low battery detector voltage whereas resistor 168 provides some leakage current flow to pull down the input to Schmitt trigger 166 as allowed by the battery voltage and the drop across zener diode 170).

There has been described herein new and unique mechanically and electrically actuated pressure regulating shut off valves which provide a high degree of regulation when open, may be simply turned off by a 180 degree rotation of the mechanical control, or may be electrically turned off by local or remote electrical means, which may take substantially any form ranging from a very simple actuating switch to more complex control systems, up to and including a battery operating moisture sensing system such as may be used to protect against appliance leakage in the home or the like. Obviously, while certain preferred embodiments have been disclosed and described herein, various changes therein may be made by those skilled in the art as may be desired for any particular application. By way of example, one could readily design a control system like that of FIG. 10 which is operative on parameters other than moisture, such as, by way of example, temperature, pressure, time, ph value, flow rate or any other parameter or combinations of parameters desired. Obviously, also while the preferred forms described herein have been disclosed as battery operated or DC operated devices, obviously AC operated circuits may also be used, the battery operated circuits having the specific advantage of not requiring an adjacent source of power or installation by an electrician. These and other changes, of course, may be made in the invention without departing from the spirit and the scope thereof.

I claim:

1. A pressure regulating electrically operable shut off valve comprising
    a housing including inlet and outlet chambers and a valve seat therebetween for fluid communication between said chambers,
    a valve closure member cooperatively disposed in said housing with respect to said valve seat so as to be encouraged by pressure in said outlet chamber toward a first position resting on said valve seat to block fluid communication between said inlet and said outlet chambers, said valve closure member being movable to a second position allowing fluid communication between said inlet and said outlet chambers, electrically operable latch means spring means coaxial with said valve member and operative in compression between said valve member and said latch means, when said latch means is in a first latch position, for yieldably encouraging said valve member toward said second position, whereby said valve may regulate the pressure of fluid in said outlet chamber by at least a partial balance between the outlet chamber pressure force on said valve closure member encouraging said valve closure member toward said first position and the force of said spring means encouraging said valve closure member toward said second position, said latch means being moveable between said first latch position holding said spring means in compression and a second latch position releasing the compression in said spring means, said latch means having permanent magnet means for retaining said latch means in said first latch position, said latch means also having a coil responsive to a current pulse to momentarily substantially demagnetize said permanent magnet means to allow said latch means to move to said second latch position, and means operative when said spring means is released to encourage said valve closure member to said first position.

2. The valve of claim 1 wherein said means operative when said spring means is released to encourage said valve closure member to said first position comprises an inlet pressure imbalance, whereby the pressure in said inlet chamber encourages said valve closure member toward said first position.

3. The valve of claim 1 wherein said means operative when said spring means is released to encourage said valve closure member to said first position is a second spring means.

4. The valve of claim 1 further comprised of manually controllable mechanical shut off means for selectivity mechanically forcing said valve closure member to and retaining it at said first position.

5. The valve of claim 4 wherein said mechanical shut off is operable upon rotation of a control handle by no more than 360 degrees.

6. The valve of claim 1 further comprised of electrical means for operating said electrically operable latch means.

7. The valve of claim 6 wherein said electrical means is a battery operated means.

8. The valve of claim 7 wherein said battery operated means includes a low battery detector.

9. The valve of claim 8 wherein said electrically operable latch means is reponsive to said low battery detector.

10. The valve of claim 6 wherein said electrical means includes means responsive to an external stimuli.

11. The valve of claim 10 wherein the external stimuli is moisture.

12. The valve of claim 6 wherein said electrical means includes a moisture probe means for sensing the presence of moisture.

13. The valve of claim 12 wherein said electrical means includes means for detecting an open or a short in the circuit of said moisture probe.

14. The valve of claim 13 wherein said electrical means is battery operated.

15. The valve of claim 14 wherein said electrical means include a low battery detector.

16. A mechanically and electrically operable shut off valve comprising a housing including inlet and outlet chambers and a valve seat therebetween for fluid communication betweeen said chambers, a valve closure member cooperatively disposed in said housing with respect to said valve seat so as to be encouraged by pressure in said outlet chamber toward a first position resting on said valve seat to block fluid communication between said inlet and said outlet chambers, said valve closure member being movable to a second position allowing fluid communication between said inlet and said outlet chambers, electrically operable latch means spring means coaxial with said valve member and operative in compression between said valve member and said latch means, when said latch means is in a first latch position, for yieldably encouraging said valve member toward said second position, whereby said valve may regulate the pressure of fluid in said outlet chamber by at least a partial balance between the outlet chamber pressure force on said valve closure member encouraging said valve closure member toward said first position and the force of said spring means encouraging said valve closure member toward said second position, said latch means being moveable between said first latch position holding said spring means in compression and a second latch position releasing the compression in said spring means, said latch means having permanent magnet means for retaining said latch means in said first latch position, said latch means also having a coil responsive to a current pulse to momentarily substantially demagnetize said permanent magnet means to allow said latch means to move to said second latch position, and means operative when said spring means is released to encourage said valve closure member to said first position, and manually controllable mechanical shut off means for selectively forcing said valve closure member to and retaining it at said first position, said mechanical shut off means being a cam means cooperatively disposed with respect to said valve closure member and rotatable about an axis perpendicular to the motion of said valve closure member to force said valve closure member to said first position when in a first angular position and to release said valve closure member when 180 degrees from said first angular position.

17. The valve of claim 16 further comprised of electrical means for operating said electrically operable latch means.

18. The valve of claim 17 wherein said electrical means is a battery operated means.

19. The valve of claim 18 wherein said battery operated means includes a low battery detector.

20. The valve of claim 19 wherein said electrically operable latch means is responsive to said low battery detector.

21. The valve of claim 17 wherein said electrical means includes means responsive to an external stimuli.

22. The valve of claim 21 wherein the external stimuli is moisture.

23. The valve of claim 17 wherein said electrical means includes a moisture probe means for sensing the presence of moisture.

24. The valve of claim 23 wherein said electrical means includes means for detecting an open or a short in the circuit of said moisture probe.

25. The valve of claim 24 wherein said electrical means include a low battery detector.

26. The valve of claim 23 wherein said electrical means is battery operated.

* * * * *